US008363264B2

United States Patent
Murashima (10) Patent No.: US 8,363,264 B2
(45) Date of Patent: Jan. 29, 2013

(54) DATA TRANSMISSION APPARATUS HAVING DATA GENERATION UNIT THAT OUTPUTS IMAGE DATA BLOCK INCLUDING DOT DATA LINES MADE UP OF DOT DATA ELEMENTS

(75) Inventor: Hiroshi Murashima, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1031 days.

(21) Appl. No.: 12/165,619

(22) Filed: Jun. 30, 2008

(65) Prior Publication Data

US 2009/0002729 A1  Jan. 1, 2009

(30) Foreign Application Priority Data

Jun. 29, 2007  (JP) ................................. 2007-171506

(51) Int. Cl.
  G06K 15/10  (2006.01)
(52) U.S. Cl. ............ 358/1.8; 358/1.15; 347/68; 347/19; 347/70; 382/232; 382/176
(58) Field of Classification Search .................. 358/1.8, 358/1.15; 382/232, 176, 156; 347/19, 68, 347/70
  See application file for complete search history.

(56) References Cited

U.S. PATENT DOCUMENTS

| 5,872,864 | A * | 2/1999 | Imade et al. .................. 382/176 |
| 5,892,847 | A * | 4/1999 | Johnson ......................... 382/232 |
| 6,984,027 | B2 | 1/2006 | Sakaida et al. | |
| 2003/0048322 | A1 * | 3/2003 | Konno et al. ................... 347/19 |
| 2003/0137556 | A1 * | 7/2003 | Nunokawa ...................... 347/43 |
| 2003/0156164 | A1 * | 8/2003 | Sakaida et al. .................. 347/68 |
| 2005/0063666 | A1 | 3/2005 | Takatsuka | |

(Continued)

FOREIGN PATENT DOCUMENTS

| JP | H02-159169 A | 6/1990 |
| JP | 2004208018 A | 7/2004 |

(Continued)

OTHER PUBLICATIONS

Ichikawa Mikiya, Printing Processing System, Jul. 22, 2004, JP 2004208018.*

(Continued)

Primary Examiner — Benny Q Tieu
Assistant Examiner — Martin Mushambo
(74) Attorney, Agent, or Firm — Baker Botts L.L.P.

(57) ABSTRACT

A data transmission apparatus transmits data relating to an image to be recorded on a recording medium to an ink-jet recording apparatus including a line-type ink-jet head which is formed with an ejection face having a plurality of ejection openings arranged in a matrix. A data generation unit included in the data transmission apparatus generates an image data block including a plurality of dot data lines each formed for each of the ejection openings. The dot data line is made up of a plurality of dot data elements corresponding to a plurality of dots arranged in a conveyance direction in the image to be recorded on the recording medium with an arrangement order of the plurality of dot data elements being according to an arrangement order of the corresponding dots in the conveyance direction. The data transmission apparatus further includes a data compression unit which compresses the image data block generated by the data generation unit, and a data transmission unit which transmits a compressed file generated by the data compression unit to the ink-jet recording apparatus.

6 Claims, 8 Drawing Sheets

U.S. PATENT DOCUMENTS

2005/0219300 A1* 10/2005 Fujita .......................... 347/16
2006/0050316 A1* 3/2006 Kakutani .................... 358/3.3

FOREIGN PATENT DOCUMENTS

JP 2005-096137 A 4/2005
JP 2006-297666 A 11/2006

OTHER PUBLICATIONS

Japan Patent Office, Notice of Reasons for Rejection for Japanese Patent Application No. 2008-171041, mailed Oct. 25, 2011.

* cited by examiner

| | INTERMEDIATE DATA | CONVERTED IMAGE DATA BLOCK | | RUN-LENGTH DATA (COMPRESSED FILE) |
|---|---|---|---|---|
| | S | — | | — |
| ⎧ | S | 00 | | 20x00 |
| ⎪ | S | 00 | | |
| THE NUMBER OF DOT DATA ELEMENTS 20 | S | 00 | | |
| ⎨ | ⋮ | ⋮ | | |
| ⎩ | S | 00 | | |
| ⎧ | D | 01 | +1 | 1x01 |
| ⎪ | D | 00 | | 29x00 |
| THE NUMBER OF DOT DATA ELEMENTS 30 | ⋮ | ⋮ | | |
| ⎩ | D | 00 | | |
| ⎧ | S | 11 | −1 | 1x11 |
| ⎪ | S | 00 | | 19x00 |
| THE NUMBER OF DOT DATA ELEMENTS 20 | ⋮ | ⋮ | | |
| ⎩ | S | 00 | | |
| ⎧ | O | 11 | −1 | 1x11 |
| ⎪ | O | 00 | | 49x00 |
| THE NUMBER OF DOT DATA ELEMENTS 50 | ⋮ | ⋮ | | |
| ⎩ | O | 00 | | |
| | D | 10 | +2 | 1x10 |
| | D | 00 | | nx00 |

FIG. 8

DATA TRANSMISSION APPARATUS HAVING DATA GENERATION UNIT THAT OUTPUTS IMAGE DATA BLOCK INCLUDING DOT DATA LINES MADE UP OF DOT DATA ELEMENTS

CROSS REFERENCE TO RELATED APPLICATION

The present application claims priority from Japanese Patent Application No. 2007-171506, which was filed on Jun. 29, 2007, the disclosure of which is herein incorporated by reference in its entirety.

BACKGROUND OF THE INVENTION

1. Field of the Invention

The present invention relates to a data transmission apparatus which transmits data relating to an image to an ink-jet recording apparatus.

2. Description of Related Art

As an image printed by an ink-jet printer becomes higher in resolution, a size of image data handled by the ink-jet printer increases. Meanwhile, there is known an ink-jet printer of line type which includes a fixed ink-jet head elongated in a direction perpendicular to a paper conveyance direction with its length equal to or larger than a paper width, as disclosed in Japanese Unexamined Patent Publication No. 2007-8175.

For maximizing a characteristic of such a line-type ink-jet printer, a capability of high-speed printing, data transmission between a host and the printer must not be a bottleneck. That is, host-printer data traffic in a unit time must not be lower than maximum data traffic processable in the unit time in the printer. However, because of a structural limitation of an apparatus, host-printer data traffic in a unit time may sometimes be lower than maximum data traffic processable in a unit time in a printer. Such measures have been taken therefor, that image data compressed and downsized in a host are transmitted to a printer which then decompresses (expands) the image data thus received to thereby apparently increase host-printer data traffic in a unit time.

SUMMARY OF THE INVENTION

Sometimes, image data transmitted from a host to a printer are converted in the host into a form complying with an arrangement pattern of ejection openings of an ink-jet head, and then transmitted to the printer. In such a case, image data resulting from conversion are a collection of dot data elements for every ejection opening of the ink-jet head in a plurality of printing cycles. The number of printing cycles is equal to [a period of time required for printing one frame image]/[one printing cycle]. The dot data element indicates the number of ink droplets or an ink ejection amount ejected from one ejection opening during one printing cycle. The printing cycle means a time required for a paper to be conveyed by a unit distance which corresponds to a printing resolution in a sub scanning direction. The host sequentially transmits all of dot data elements for one frame image to the printer on a unit by unit basis as one unit is formed by a plurality of dot data elements for one printing cycle. In a case where, using this technique, image data resulting from conversion are transmitted from a host to the ink-jet head disclosed in the above-mentioned patent document, a compression efficiency of the image data resulting from the conversion is lowered and a data size cannot sufficiently be reduced. It is therefore impossible to transmit the image data in a short time. This is because, since a plurality of ejection openings are arranged in a matrix on an ejection face of the ink-jet head, dots relating to the plurality of dot data elements for one printing cycle do not neighbor each other on an image to be printed, so that a correlation of an ink ejection amount between the dot data elements is low.

An object of the present invention is to provide a data transmission apparatus capable of shortening a data transmission time.

According to an aspect of the present invention, there is provided a data transmission apparatus which transmits data relating to an image to be recorded on a recording medium to an ink-jet recording apparatus including a conveyor and a line-type ink-jet head. The conveyor conveys a recording medium. The line-type ink-jet head is elongated in a direction perpendicular to a conveyance direction of the recording medium conveyed by the conveyor and formed with an ejection face having a plurality of ejection openings arranged in a matrix. The data transmission apparatus comprises a data generation unit, a data compression unit, and a data transmission unit. The data generation unit generates an image data block including a plurality of dot data lines each formed for each of the ejection openings and each made up of a plurality of dot data elements corresponding to a plurality of dots arranged in the conveyance direction in the image to be recorded on the recording medium. An arrangement order of the plurality of dot data elements is according to an arrangement order of the corresponding dots in the conveyance direction. The data compression unit compresses the image data block generated by the data generation unit. The data transmission unit transmits a compressed file generated by the data compression unit to the ink-jet recording apparatus.

Generally, there is a relatively low possibility that ink ejection amounts for two neighboring dots in an image are different. Consequently, there is a low possibility that two neighboring dot data elements indicate different ink ejection amounts. Therefore, the data compression unit can compress the image data block with good efficiency. This can reduce a data size of a compressed file to be transmitted by the data transmission apparatus to the ink-jet recording apparatus. As a result, the compressed file can be transmitted in a shortened time. In addition, since the dot data line is formed for every ejection opening, it suffices that the ink-jet recording apparatus having received the compressed file decompresses the file and then just supplies, as drive data, an image data block obtained to a drive circuit for driving an energy application unit which applies energy to ink in the ink-jet head to eject an ink droplet from each corresponding ejection opening. It is therefore easy to make a control in the ink-jet recording apparatus.

Moreover, a computer program product according to the present invention is able to make a computer execute the above-described functions. The computer program product is stored on a computer readable recording medium. As the recording medium, a removable-type one such as a CD-ROM (Compact Disc Read Only Memory), an FD (Flexible Disk) and an MO (Magneto Optical) disk, or a fixed-type one such as a hard disk may be adopted.

BRIEF DESCRIPTION OF THE DRAWINGS

Other and further objects, features and advantages of the invention will appear more fully from the following description taken in connection with the accompanying drawings in which.

DESCRIPTION OF THE PREFERRED EMBODIMENTS

Figure 1:
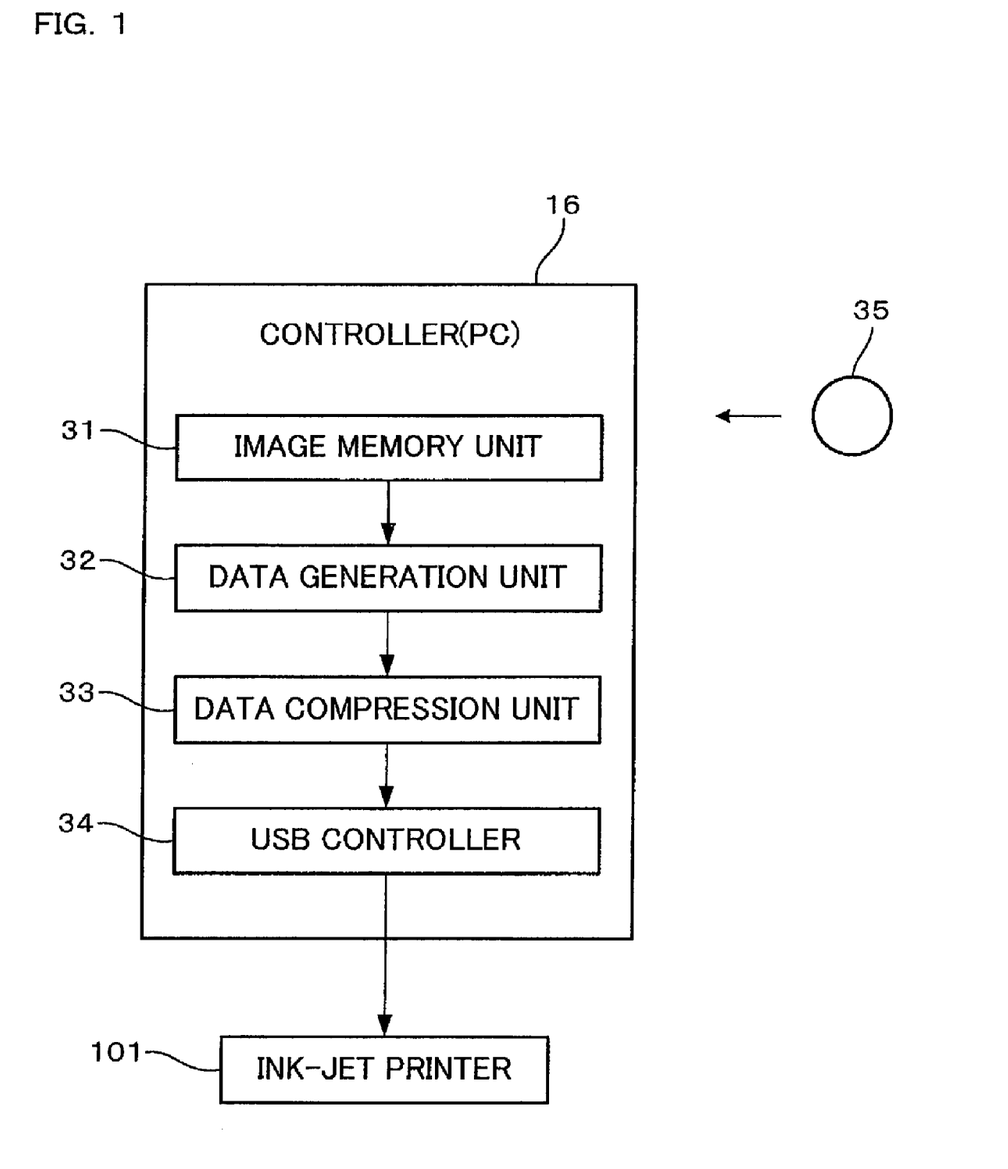
FIG. 1 is a block diagram of a controller according to an embodiment of the present invention.

FIG. 1 is a block diagram of a controller 16 which is an embodiment of a data transmission apparatus according to the present invention. The controller 16 which controls an ink-jet printer 101 is established in a personal computer (PC) by cooperation of hardware and software. The hardware includes a CPU (Central Processing Unit), a RAM (Random Access Memory), a ROM (Read Only Memory), an HDD (Hard Disk Drive), and the like, for example. The software is stored in the ROM and/or the HDD. Various software including programs for making the controller 16 work as a data transmission apparatus is stored in a hard disk. The programs have been installed on the controller 16 from a removable-type recording medium 35 such as a CD-ROM, an FD, an MO, or the like.

The controller 16 is connected in communication to the ink-jet printer 101 via an USB (Universal Serial Bus) cable. The controller 16 generates an image data block relating to an image to be printed on a paper by the ink-jet printer 101, then compresses the image data block, and transmits a compressed file generated by compression to the ink-jet printer 101. That is, the controller 16 functions as a data transmission apparatus. In addition, the controller 16 controls the ink-jet printer 101 so as to print an image relating to the compressed file based on a user's command. In the following, a description will be given mainly to a function of the controller 16 as a data transmission apparatus.

Figure 2:
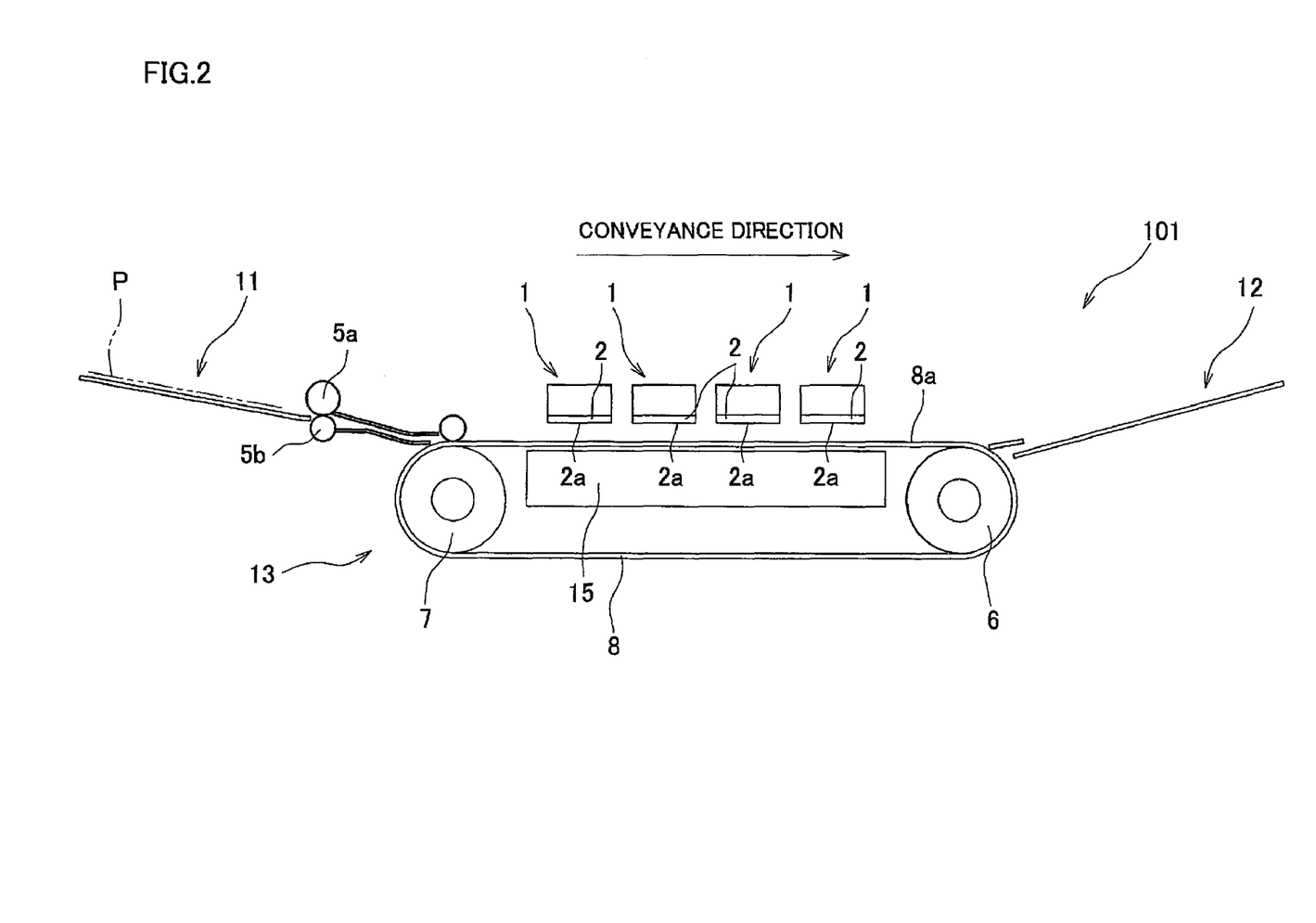
FIG. 2 is a schematic side view of an ink-jet printer shown in FIG. 1.

First, the ink-jet printer 101 which is controlled by the controller 16 will be described with reference to FIG. 2. FIG. 2 is a schematic side view showing a general structure of the ink-jet printer 101.

As shown in FIG. 2, the ink-jet printer 101 is a color ink-jet printer including four ink-jet heads 1 which eject ink of four different colors (yellow, magenta, cyan, and black), respectively. The ink-jet printer 101 has a paper feed tray 11 shown in a left part of FIG. 2, and a paper discharge tray 12 shown in a right part of FIG. 2.

Formed within the ink-jet printer 101 is a conveyance path through which a paper P as a recording medium is conveyed from the paper feed tray 11 to the paper discharge tray 12. A pair of feed rollers 5a and 5b which conveys a paper while pinching it therebetween is provided immediately downstream of the paper feed tray 11. The pair of feed rollers 5a and 5b feeds the paper P out from the paper feed tray 11 to a right side in FIG. 2. The paper P fed out by the pair of feed rollers 5a and 5b is supplied to a belt conveyor mechanism 13. The belt conveyor mechanism 13 includes two belt rollers 6 and 7, an endless conveyor belt 8, and a platen 15. The endless conveyor belt 8 is wound on the rollers 6 and 7 so as to be stretched between them. The platen 15 is positioned within a region enclosed by the conveyor belt 8 so as to be opposed to the four ink-jet heads 1.

As a not-shown motor makes the belt roller 6 rotate clockwise, the conveyor belt 8 rotates clockwise. Thereby, the conveyor belt 8 conveys the paper P toward the paper discharge tray 12 while keeping the paper P which has been pressed onto its outer surface having adhesion.

The four ink-jet heads 1 are arranged in a conveyance direction of the paper P, and fixed at a position opposed to the conveyance path. Thus, the ink-jet printer 101 is of line type. Each of the four ink-jet heads 1 has a head main body 2 at a lower end thereof. The head main body 2 has a rectangular parallelepiped shape elongated in a direction perpendicular to the conveyance direction. A bottom face of the head main body 2 serves as an ejection face 2a which is opposed to a conveyor face 8a. The conveyor face 8a exists in an upper part of the outer surface of the conveyor belt 8. While the paper P conveyed by the conveyor belt 8 is sequentially passing just under the four head main bodies 2, ink droplets of the respective colors are ejected from the ejection faces 2a to an upper face of the paper P, i.e., to a printing face. As a result, a desired color image is formed on the paper P.

Figure 3:
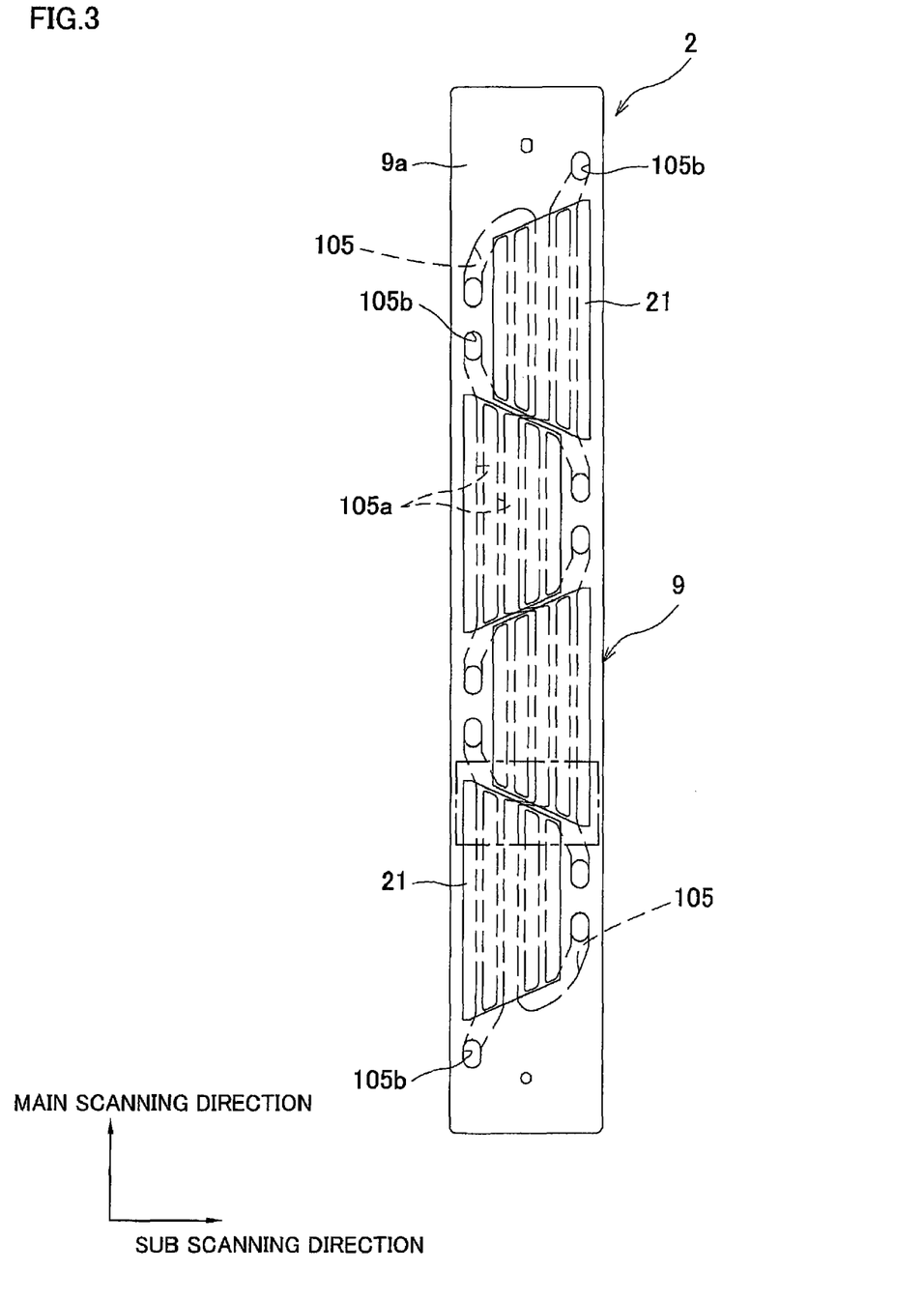
FIG. 3 is a plan view of a head main body shown in FIG. 2.
Figure 4:
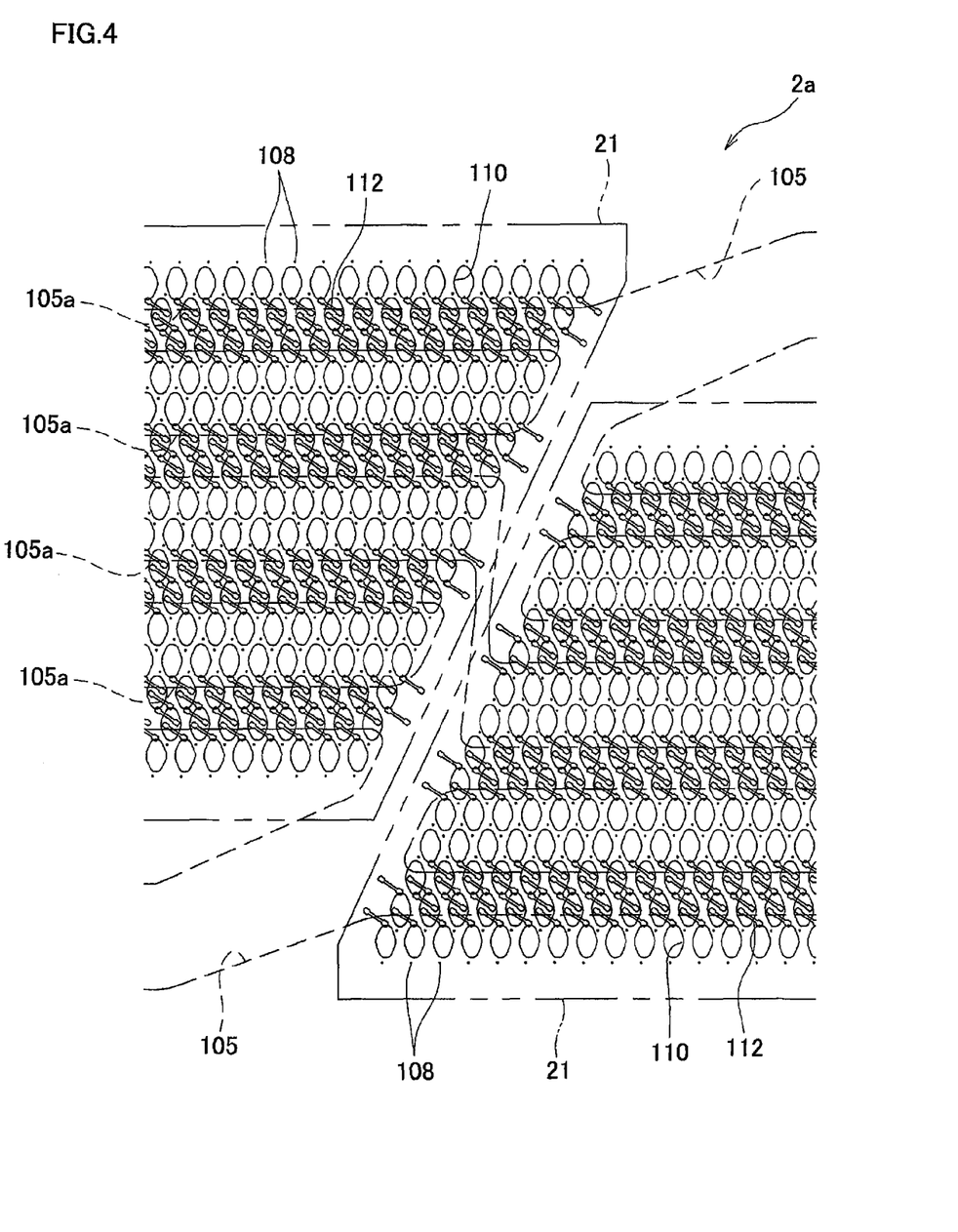
FIG. 4 shows on an enlarged scale a region enclosed by an alternate long and short dash line illustrated in FIG. 3.

Next, the head main body 2 will be described with reference to FIGS. 3 and 4. FIG. 3 is a plan view of the head main body 2. FIG. 4 shows on an enlarged scale a region enclosed by an alternate long and short dash line illustrated in FIG. 3. In FIG. 4, for easy understanding, actuator units 21 are illustrated with alternate long and two short dashes lines though they should actually be illustrated with solid lines, while ejection openings 108, pressure chambers 110, and apertures 112 are illustrated with solid lines though they should actually be illustrated with broken lines.

As shown in FIG. 3, the head main body 2 includes a passage unit 9 and four actuator units 21 which are fixed to an upper face 9a of the passage unit 9. The actuator unit 21 includes a plurality of individual electrodes which are opposed to a plurality of pressure chambers 100 formed in the passage unit 9. The actuator unit 21 serves to selectively apply ejection energy to ink contained in the pressure chambers 110.

A total of ten ink supply openings 105b are open in the upper face 9a of the passage unit 9. A plurality of manifold channels 105 and a plurality of sub manifold channels 105a are formed within the passage unit 9. The ink supply opening 105b serves as one end of each manifold channel 105. The sub manifold channels 105a are branched from the manifold channels 105. Formed on a lower face of the passage unit 9 is an ejection face 2a where ejection openings 108 which are nozzle openings are arranged in a matrix, that is, regularly arranged in two dimensions, as shown in FIG. 4. On the upper face of the passage unit 9, a plurality of pressure chambers 110 are arranged in a matrix.

A description will be given to an ink flow in the passage unit 9. Ink is supplied from a reservoir unit through the ink supply openings 105b into the passage unit 9, and then branches from the manifold channels 105 into the sub manifold channels 105a. Ink contained in the sub manifold channels 105a flows into each individual ink passage, and reaches the ejection opening 108 through an aperture 112 functioning as a throttle and a pressure chamber 110.

Next, the actuator unit 21 will be described. As shown in FIG. 3, each of the four actuator units 21 has a trapezoidal shape in a plan view. The four actuator units 21 are arranged in a zigzag pattern avoiding the ink supply openings 105b. Parallel opposed sides of each actuator unit 21 extend along a lengthwise direction of the passage unit 9, and oblique sides of every neighboring actuator units 21 overlap each other with respect to a widthwise direction of the passage unit 9, that is, with respect to the sub scanning direction.

The actuator unit 21 includes a plurality of actuators which are opposed to the respective pressure chambers 110. In every printing cycle, each of the actuators selectively applies ejection energy to ink contained in the pressure chamber 110. To be more specific, the actuator unit 21 is formed of three piezoelectric sheets made of a lead zirconate titanate (PZT)-base ceramic material having ferroelectricity. Each of the piezoelectric sheets is a continuous flat plate having such a size as to extend over a plurality of pressure chambers 110. On the uppermost piezoelectric sheet, individual electrodes are formed at positions opposed to the respective pressure chambers 110. A common electrode is interposed between the uppermost piezoelectric sheet and the lower piezoelectric sheet. The common electrode extends over an entire surface of the sheets.

By a signal given from a control circuit in the printer 101, the common electrode is, in its regions corresponding to all the pressure chambers 110, equally kept at the ground potential. On the other hand, a drive signal from the control circuit is selectively inputted into the individual electrodes. Like this, a portion of the actuator unit 21 sandwiched between the individual electrode and the pressure chamber 110 works as an individual actuator. Thus, a plurality of actuators the number of which is the same as the number of the pressure chambers 110 are formed in the actuator unit 21.

Here, a driving method of the actuator unit 21 will be described. The actuator unit 21 has a so-called unimorph type actuator in which one piezoelectric sheet most distant from the pressure chamber 110 serves as an active layer while the other two piezoelectric sheets serve as inactive layers. By a pulse being outputted to an individual electrode, a corresponding portion of the piezoelectric sheets deforms to apply pressure (ejection energy) to ink contained in a corresponding pressure chamber 110, so that an ink droplet is ejected from an ejection opening 108.

Figure 5:
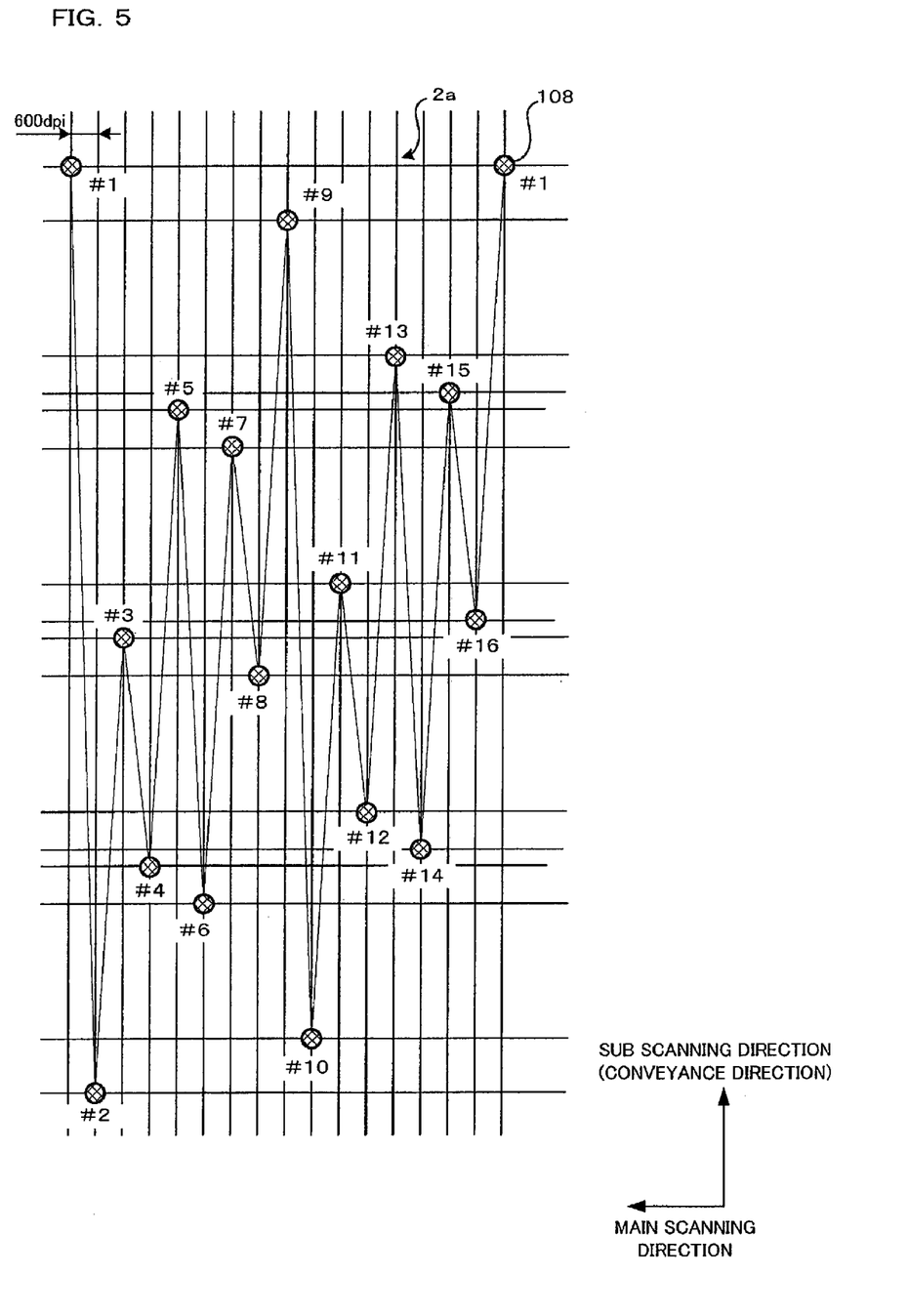
FIG. 5 is a partial enlarged view of an ejection face shown in FIG. 4.

Next, a position of the ejection opening 108 in the ejection face 2a will be described with reference to FIG. 5. FIG. 5 is a partial plan view of the ejection face 2a on an enlarged scale, showing a positional relationship of the ejection openings 108. Here, a horizontal direction of FIG. 5 indicates a main scanning direction (which is perpendicular to the conveyance direction), and a vertical direction of FIG. 5 indicates the sub scanning direction. In FIG. 5, as a matter of convenience, different scales are applied to the main scanning direction and the sub scanning direction.

On the ejection face 2a, a plurality of ejection openings 108 opposed to one actuator unit 21 are arranged in a matrix in the main scanning direction and the sub scanning direction, that is, regularly arranged in two dimensions, as shown in FIG. 5. More specifically, each ejection opening 108 is located on any of sixteen imaginary lines which extend in parallel with respect to the main scanning direction. On each imaginary line, neighboring ejection openings 108 are at regular intervals. Sixteen ejection openings 108 (hereinafter referred to as ejection openings #1 to #16), which are positioned on different imaginary lines and arranged within a range corresponding to [600 dpi (approximately 42 μm)*15] without overlapping each other with respect to the main scanning direction, form a base unit for forming an image at 600 dpi which is a maximum resolution in the main scanning direction. Within one actuator unit 21, base units are continuously arranged in the main scanning direction.

All of the ejection openings 108 opposed to the four actuator units 21 have such a positional relationship that, when these ejection openings 108 are projected in a direction perpendicular to the imaginary line which extends in the main scanning direction, all projective points thus obtained are arranged at regular intervals corresponding to the resolution 600 dpi (approximately 42 μm). Therefore, in an image printed on the paper P, a dot line made up of a plurality of dots (including a non-ejection dot with no ink landed) along the conveyance direction corresponds to one ejection opening 108. In the image printed on the paper P, a plurality of such dot lines are formed at regular intervals of approximately 42 μm.

In addition, two ejection openings 108 neighboring one ejection opening 108 with respect to a lengthwise direction of the head 1 which means the main scanning direction (for example, two ejection openings #7 and #9 neighboring the ejection opening #8) are positioned on any of an upper side and a lower side of the one ejection opening 108 with respect to the sub scanning direction (in other words, any of an upstream side and a downstream side of the one ejection opening 108 with respect to the conveyance direction). This relationship applies to any ejection opening 108. That is, a plurality of ejection openings 108 are arranged in a zigzag pattern along the main scanning direction. Accordingly, individual ink passages including the ejection openings 108 can be arranged at a high density in the passage unit 9.

Referring to FIG. 1 again, the controller 16 will be described. The controller 16 has an image memory unit 31, a data generation unit 32, a data compression unit 33, and an USB controller 34 which is a transmission means. The image memory unit 31 stores therein image data relating to an image to be printed on the paper P by the ink-jet printer 101. In an example, the image data may be supplied from outside through a memory card (not shown), and a file format thereof may be a universal one such as jpeg, gif, bmp, doc, or the like. From the image data stored in the image memory unit 31, the data generation unit 32 generates an image data block which will be detailed later. The data compression unit 33 carries out a run-length compression of the image data block generated by the data generation unit 32. The USB controller 34 transmits a compressed file generated by the data compression unit 33 to the ink-jet printer 101.

Operations of the data generation unit 32 and the data compression unit 33 will be described with reference to FIGS. 6 to 8. Usually, an image printing resolution in the main scanning direction, that is, an interval of arrangement of the ejection openings 108 with respect to the main scanning direction (which is approximately 42 μm in this embodiment), does not conform with a resolution of the image data in the main scanning direction in the case that a size of the image data stored in the image memory unit 31 is defined as a desired printing size. Moreover, although one pixel of the image data has relatively large data volume, a concentration which is expressed by dots formed on the paper can be adjusted in only four levels which correspond to the number of ink droplets (0 to 3) ejected from the ejection opening 108 within one printing cycle. Accordingly, the data generation unit 32 has to convert the image data stored in the image memory unit 31 into a format adapted to an arrangement pattern of the ejection openings 108, in consideration of a desired printing size of the image data. Image data resulting from conversion are a collection of dot data elements for every ejection opening 108 of the head 1 in a plurality of printing cycles. The number of printing cycles is equal to [a period of time required for printing one frame image]/[one printing cycle].

In this embodiment, the data generation unit 32 generates an image data block including a plurality of dot data lines each formed for each ejection opening 108. Here, the dot data line is made up of a plurality of dot data elements corresponding to a plurality of dots arranged in the conveyance direction in an image to be recorded on the paper P. An arrangement order of the plurality of dot data elements is according to an arrangement order of the corresponding dots in the conveyance direction.

Figure 6:
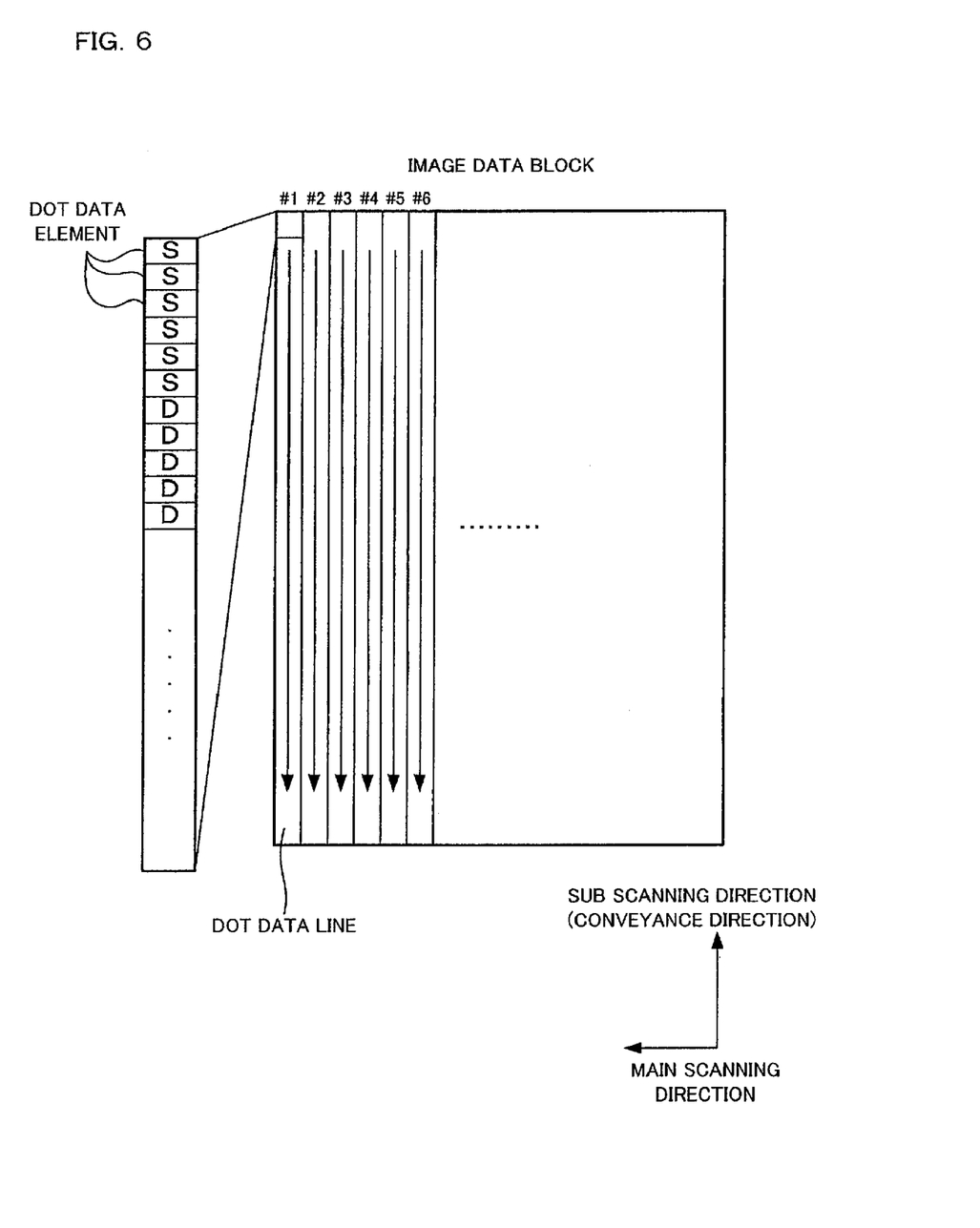
FIG. 6 is a view for explaining a structure of an image data block which is generated by a data generation unit shown in FIG. 1.

As shown in FIG. 6, the image data block generated by the data generation unit 32 includes a plurality of dot data lines each formed for each ejection opening 108. Each of the dot data lines is a collection of dot data elements which correspond to one ejection opening 108. Accordingly, the image data block includes a plurality of dot data elements for a plurality of dots which are arranged in a matrix in two directions, i.e., the main scanning direction and the sub scanning direction, in the image to be printed on the paper P. The dot data element indicates the number of ink droplets ejected from the ejection opening 108 during one printing cycle, that is, it indicates an ink ejection amount. In this embodiment, when one ink droplet is ejected from the ejection opening 108, an ink ejection amount indicated by the dot data element is expressed as Single (S). When two ink droplets are ejected from the ejection opening 108, an ink ejection amount indicated by the dot data element is expressed as Double (D). When three ink droplets are ejected from the ejection opening 108, an ink ejection amount indicated by the dot data element is expressed as Triple (T). When no ink droplets are ejected from the ejection opening 108, an ink ejection amount indicated by the dot data element is expressed as None (0).

Generally, there is a relatively low possibility that ink ejection amounts for two neighboring dots in an image are different. Consequently, there is a low possibility that, in a dot data line formed corresponding to a dot line extending in the sub scanning direction, two neighboring dot data elements indicate different ink ejection amounts. Therefore, the image data block shown in FIG. 6 can be compressed with a high compression ratio.

Figure 7:
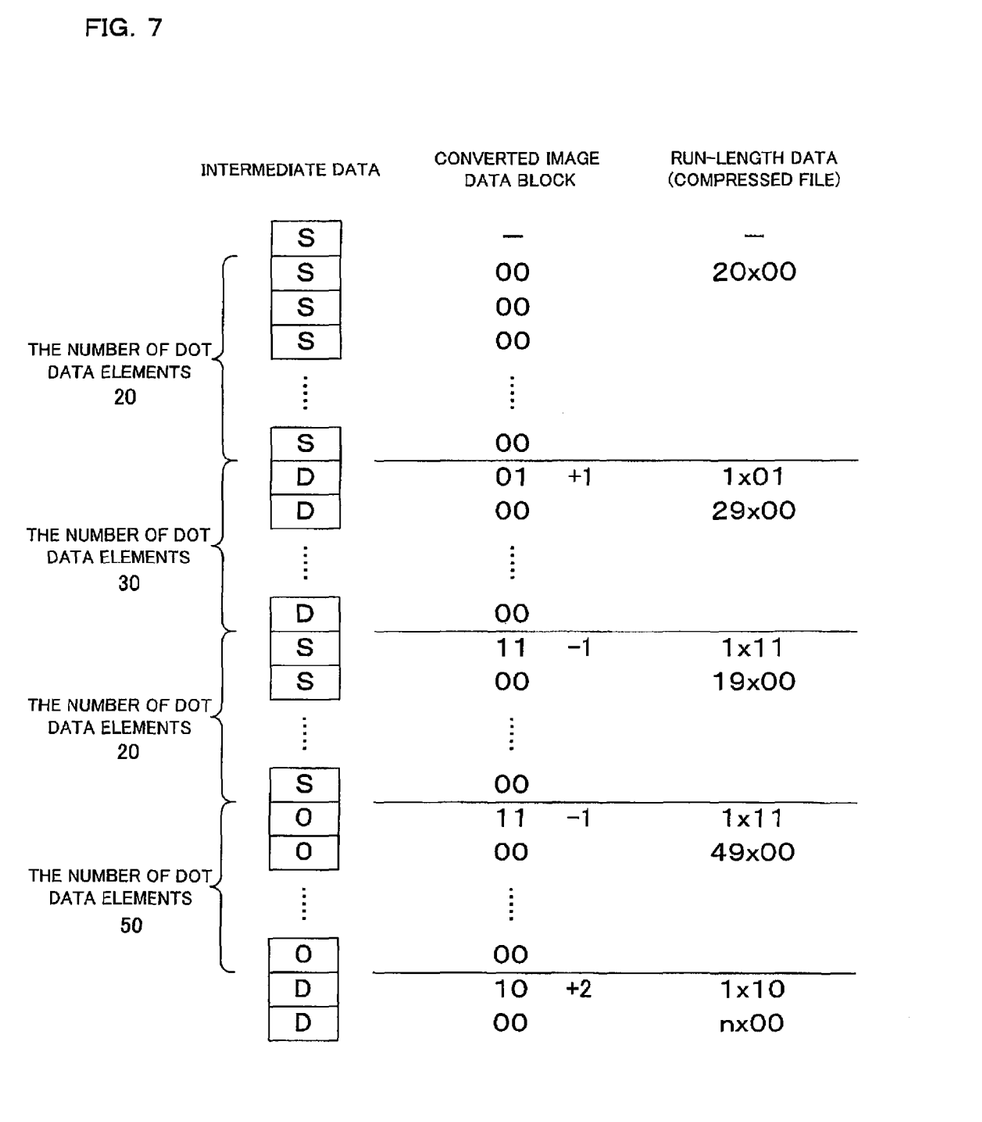
FIG. 7 shows a process of generation of a compressed file from the image data block by the data generation unit and a data compression unit shown in FIG. 1.
Figure 8:
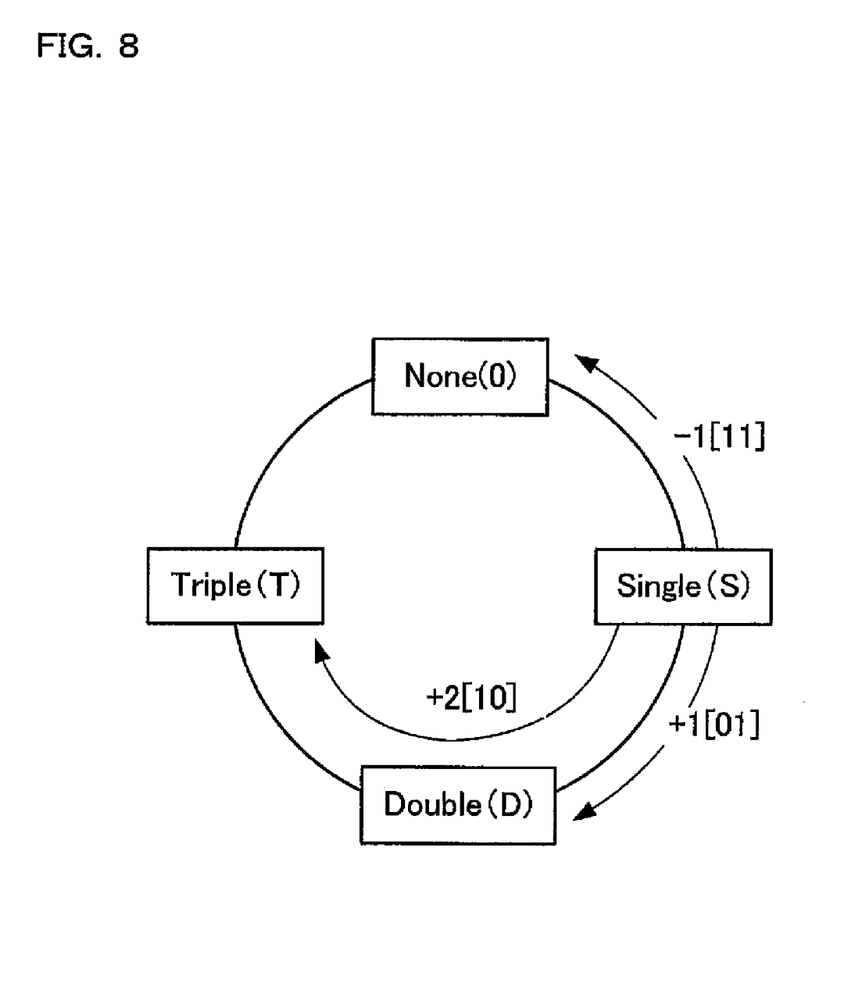
FIG. 8 shows data conversion which is carried out when the data generation unit shown in FIG. 1 generates the image data block.

Then, as shown in FIG. 7, the data generation unit 32 generates intermediate data by connecting a plurality of dot data lines in an order according to an arrangement order in the main scanning direction. Subsequently, the data generation unit 32 converts an ink ejection amount indicated by each dot data element in the intermediate data, into information of change in ink ejection amount between two neighboring dot data elements in the intermediate data. More specifically, change information of an ink ejection amount of a certain dot data element in comparison with a dot data element corresponding to an upstream neighboring dot is recorded on the certain dot data element. This is performed sequentially from the first dot data element in the intermediate data. This change information is represented by two bits. Resulting data are called a converted image data block.

How the change information is determined will be described here. As shown in FIG. 8, a sequence of Single (S), Double (D), Triple (T), and None (0) are arranged clockwise. Taking "00" which indicates no change in dot data element as a reference, one is added to "00" upon every clockwise change, while one is subtracted from "00" upon every counterclockwise change. For example, when an ink ejection amount indicated by a former dot data element is Single (S) and an ink ejection amount indicated by a current dot data element is Double (D), there is one clockwise change. Therefore, one is added, to record "01" as change information indicated by the current dot data element. When an ink ejection amount indicated by a former dot data element is Single (S) and an ink ejection amount indicated by a current dot data element is Triple (T), there are two clockwise changes. Therefore, two is added, to record "10" as change information indicated by the current dot data element. When an ink ejection amount indicated by a former dot data element is Single (S) and an ink ejection amount indicated by a current dot data element is None (0), there is one counterclockwise change. Therefore, one is subtracted, to record "11" as change information indicated by the current dot data element. In the converted image data block thus generated by the data generation unit 32, change in ink ejection amount between two dots neighboring in the conveyance direction in a dot line is recorded as information of change in ink ejection amount which is indicated by a dot data element for the more downstream dot with respect to the sub scanning direction. As one modification, it may be possible that, in the converted image data block generated by the data generation unit 32, change in ink ejection amount between two dots neighboring in the conveyance direction is recorded as information of change in ink ejection amount which is indicated by a dot data element for the more upstream dot with respect to the sub scanning direction.

In an example shown in FIG. 7, while dot data elements indicating that an ink ejection amount is Single (S) are continuing in the intermediate data, there is no change in ink ejection amount between the neighboring dot data elements. Therefore, the dot data elements are recorded with "00" as information of change in ink ejection amount. When an ink ejection amount indicated by a dot data element changes from Single (S) to Double (D), one is added so that the dot data element is recorded with "01" as information of change in ink ejection amount. Then, while dot data elements indicating that an ink ejection amount is Double (D) are continuing, there is no change in ink ejection amount indicated by the two neighboring dot data elements. Therefore, the dot data elements are recorded with "00" as information of change in ink ejection amount. When an ink ejection amount indicated by a dot data element changes from Double (D) to Single (S), one is subtracted so that the dot data element is recorded with "11" as information of change in ink ejection amount. Thereafter, the same conversion is carried out. When change information is recorded in all dot data elements included in the intermediate data, generation of the converted image data block is completed.

As thus far described above, there is a high possibility that, in the intermediate data which are a collection of dot data lines, dot data elements indicating any one of Single (S), Double (D), Triple (T), and None (0) neighbor each other. In other words, there is a low possibility that ink ejection amounts indicated by two neighboring dot data elements are different. Accordingly, in the converted image data block, dot data elements indicating "00" are continuously arranged, with a high possibility.

When the data generation unit 32 completes generation of the converted image data block, the data compression unit 33 carries out data compression of the converted image data block to generate a compressed file. The data compression unit 33 carries out data compression of the converted image data block in a run-length method. The run-length method is one of data compression methods. According to the run-length method, when a plurality of dot data elements indicating the same information continuously appear in data, the data are expressed by the information indicated by the dot data elements and the number of continuous dot data elements. In the example shown in FIG. 7, in the converted image data block, twenty dot data elements indicating "00", one dot data element indicating "01", twenty-nine dot data elements indicating "00", one dot data element indicating "11", nineteen dot data elements indicating "00", one dot data element indicating "11", forty-nine dot data elements indicating "00", one dot data element indicating "10", and n dot data elements indicating "00" are arranged from the top. Accordingly, a compressed file resulting from run-length data compression carried out by the data compression unit 33 is expressed in the form of 20*00, 1*01, 29*00, 1*11, 19*00, 1*11, 49*00, 1*10, and n*00 in this order. As the number of continuous dot data elements indicating "00" in the converted image data block increases, the data compression unit 33 compresses the converted image data block with a higher compression efficiency. Since there is a high possibility that many dot data elements indicating "00" continuously appear in the converted image data block, the converted image data block is compressed with a higher compression efficiency.

According to the above-described embodiment, the data compression unit 33 can very efficiently compress the converted image data block. This can reduce a data size of a compressed file to be transmitted by the data transmission apparatus to the ink-jet recording apparatus. As a result, the compressed file can be transmitted to the ink-jet printer 101 in a shortened time.

In addition, since the dot data line is formed for every ejection opening 108, it suffices that the ink-jet printer 101 having received the compressed file decompresses the file and then just supplies, as drive data, the converted image data block obtained to a drive circuit for driving an actuator which applies energy to eject an ink droplet from each corresponding ejection opening 108. It is therefore easy to make a control in the ink-jet printer 101.

In the above-described embodiment, the data compression unit 33 compresses the converted image data block generated by the data generation unit 32. However, the image data block generated by the data generation unit 32 may be compressed by the data compression unit 33. In this case as well, the data compression unit 33 can efficiently compress the image data block.

Although in the above-described embodiment the data compression unit 33 compresses data in the run-length method, other methods such as an entropy coding, a universal coding, and the like may be used for data compression. Even though these other methods are adopted, an image data block, in which dot data elements indicating the same ink ejection amount are more likely to continuously appear, can be efficiently compressed.

In the above-described embodiment, the controller 16 transmits the compressed file to the ink-jet printer 101 through the USB controller 34. However, it may also be possible that the compressed file is transmitted to the ink-jet printer 101 through a communication means other than the USB.

In the above-described embodiment, on the ejection face 2a of the ink-jet head 1, two ejection openings 108 neighboring one ejection opening 108 with respect to the main scanning direction are positioned on any one of the upper side and the lower side of the one ejection opening 108 with respect to the sub scanning direction. However, it may also be possible that one of the two ejection openings is positioned on the upper side of the one ejection opening 108 while the other is positioned on the lower side of the one ejection opening 108.

In the above-described embodiment, the controller 16 is realized by a program running on the PC. However, the controller 16 may be realized by a program running on an apparatus other than the PC.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A data transmission apparatus which transmits data relating to an image to be recorded on a recording medium to an ink-jet recording apparatus comprising a conveyor which conveys a recording medium and a line-type ink-jet head which is elongated in a direction perpendicular to a conveyance direction of the recording medium conveyed by the conveyor, formed with an ejection face having a plurality of ejection openings arranged in a matrix pattern, and fixed at a position opposing a conveyance path of the recording medium when ejecting ink droplets, the data transmission apparatus comprising:
    a data generation unit which generates an image data block comprising a plurality of dot data lines each formed for each of the ejection openings and each made up of a plurality of dot data elements corresponding to a plurality of dots arranged in the conveyance direction in the image to be recorded on the recording medium with an arrangement order of the plurality of dot data elements corresponding to an arrangement order of the corresponding dots in the conveyance direction;
    a data compression unit which compresses each of the plurality of dot data lines of the image data block generated by the data generation unit, based on the arrangement order of the plurality of dot data elements of the each of the plurality of dot data lines; and
    a data transmission unit which transmits a compressed file generated by the data compression unit to the ink-jet recording apparatus.

2. The data transmission apparatus according to claim 1, wherein the data generation unit records information of change between two neighboring dot data elements in the image data block into one of the two dot data elements.

3. The data transmission apparatus according to claim 1,
    wherein the plurality of ejection openings eject ink droplets of the same color, and
    wherein, in the ink-jet head, two ejection openings neighboring on both sides the ejection opening with respect to a longitudinal direction of the ink jet head are positioned only on one of an upstream side and a downstream side of the ejection opening with respect to the conveyance direction.

4. The data transmission apparatus according to claim 1, wherein, the data compression unit compresses data generated by connecting the plurality of dot data lines of the image data block in an order corresponding to an arrangement order of the plurality of ejection openings corresponding to the plurality of dot data lines, wherein the arrangement order of the plurality of ejection openings is along a direction orthogonal to the conveyance direction.

5. A non-transitory, computer readable medium on which is stored a computer program product for execution in a computer which transmits data relating to an image to be recorded on a recording medium to an ink jet recording apparatus comprising a conveyor which conveys a recording medium and a line-type ink jet head which is elongated in a direction perpendicular to a conveyance direction of the recording medium conveyed by the conveyor, formed with an ejection face having a plurality of ejection openings arranged in a matrix pattern, and fixed at a position opposing a conveyance path of the recording medium when ejecting ink droplets, the computer program product instructing the computer function as:

a data generation unit which generates an image data block comprising a plurality of dot data lines each formed for each of the ejection openings and each made up of a plurality of dot data elements corresponding to a plurality of dots arranged in the conveyance direction in the image to be recorded on the recording medium with an arrangement order of the plurality of dot data elements corresponding to an arrangement order of the corresponding dots in the conveyance direction;

a data compression unit which compresses each of the plurality of dot data lines of the image data block generated by the data generation unit, based on the arrangement order of the plurality of dot data elements of the each of the plurality of dot data lines; and a data transmission unit which transmits a compressed file generated by the data compression unit to the ink jet recording apparatus.

6. A system comprising:

an inkjet recording apparatus; and a data transmission apparatus configured to transmit data relating to an image to be recorded on a recording medium to the inkjet recording apparatus, wherein the inkjet recording apparatus comprises:

a conveyor configured to convey a recording medium; and a line-type inkjet head which is elongated in a direction perpendicular to a conveyance direction of the recording medium conveyed by the conveyor, formed with an ejection face having a plurality of ejection openings arranged in a matrix pattern, and fixed at a position opposing a conveyance path of the recording medium when ejecting ink droplets, wherein the data transmission apparatus comprises:

a data generation portion configured to generate an image data block comprising a plurality of dot data lines each formed for each of the ejection openings and each made up of a plurality of dot data elements corresponding to a plurality of dots arranged in the conveyance direction in the image to be recorded on the recording medium with an arrangement order of the plurality of dot data elements corresponding to an arrangement order of the corresponding dots in the conveyance direction;

a data compression portion configured to generate a compressed file by compressing each of the plurality of dot data lines of the image data block generated by the data generation unit, based on the arrangement order of the plurality of dot data elements of the each of the plurality of dot data lines; and a data transmission portion configured to transmit the compressed filed generated by the data compression portion to the inkjet recording apparatus, wherein the inkjet recording apparatus is configured to receive the compressed file generated by the data compression portion.

* * * * *